Sept. 16, 1958   E. DAMOND   2,851,889
ROTATABLE VIBRATION GENERATORS
Filed March 15, 1955   3 Sheets-Sheet 1
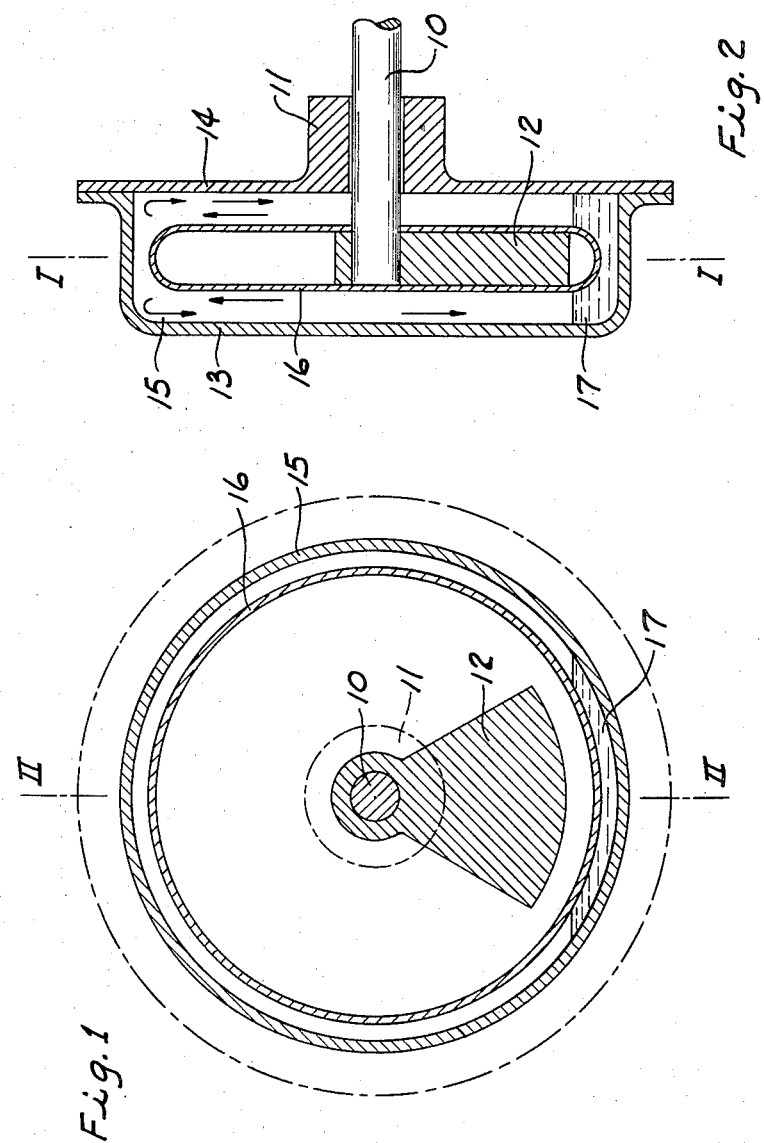
INVENTOR.
EMILE DAMOND
BY
William D. Carothers
HIS ATTORNEY Sept. 16, 1958     E. DAMOND     2,851,889
ROTATABLE VIBRATION GENERATORS
Filed March 15, 1955     3 Sheets-Sheet 2
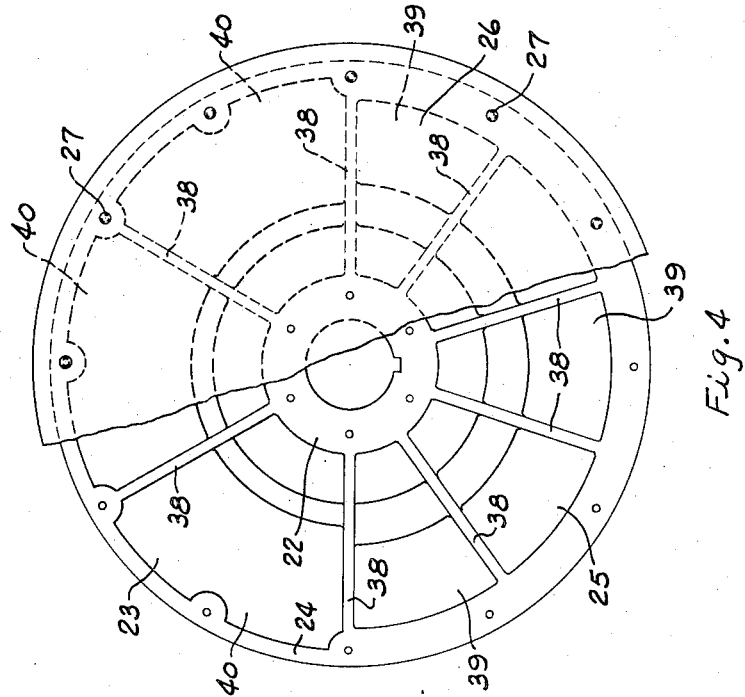
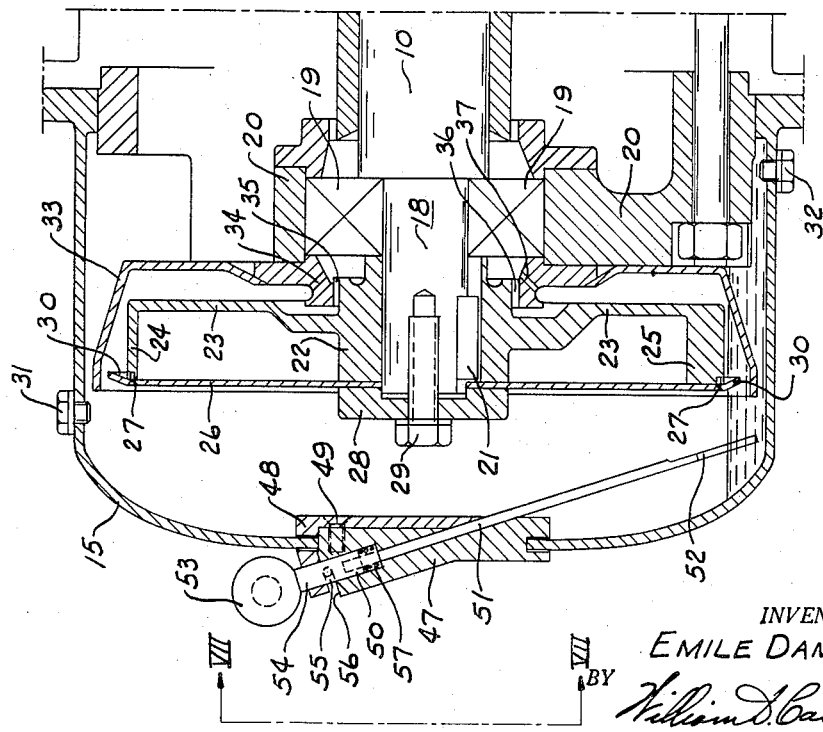
INVENTOR.
EMILE DAMOND
BY
HIS ATTORNEY Sept. 16, 1958      E. DAMOND      2,851,889
ROTATABLE VIBRATION GENERATORS Filed March 15, 1955      3 Sheets-Sheet 3

INVENTOR.
EMILE DAMOND
BY
HIS ATTORNEY

United States Patent Office 2,851,889
Patented Sept. 16, 1958

2,851,889

ROTATABLE VIBRATION GENERATORS

Emile Damond, Paris, France

Application March 15, 1955, Serial No. 494,473

11 Claims. (Cl. 74—87)

The present invention has for its object the improvement in vibration generators of the rotating type, in which the vibrations are produced by the rotation of a shaft mounted with unbalanced weights in one or several points. In these devices the unbalanced shaft driven in rotation by appropriate means, turns in bearings, which are fastened solidly to the device to be vibrated, chutes, screens, hoppers, etc., and the vibrations due to the unbalanced weights are transmitted to this device by the shaft and the bearing.

Vibrators of this type are at present used in the industry, in the mine, public works, etc. But up to date their power was limited and one has not been able to build devices of satisfactory power, of more than a few kilowatts. However, powerful vibrators are desired for a number of applications.

This impossibility to obtain high power derives from the fact that one has not been able, up to date, to give with the forces created and imposed to the bearings or anti-friction races, a suitable lubrication, nor to suppress excessive heating.

The applicant has found that one can obtain vibration generators of greater power, which are capable to give prolonged service without the disadvantages above mentioned by mounting the member forming the unbalanced weight in an envelope which is circular and provided with a flanged rim.

By giving to the unbalanced weight a flanged rim one creates a rotating mass conserving all the dynamic properties of a usual eccentric mass, but representing exteriorly in form a continuous disc.

If the usual unbalanced weight rotates in air or in the gas which surrounds it, it provokes a friction and considerable stirring up, producing an undesired heating. If, however, the rotating mass represents a suitable aerodynamic rotation form, the stirring up or disturbances are very much reduced and the heating, notably that of the bearings or anti-friction races, becomes negligible. The adopted rotating enclosure shall be chosen in such a fashion to respond, and to the best possible conditions, to the particular aerodynamics of the atmosphere in which the rotating mass turns.

If, furthermore, following another characteristic of the invention, one utilizes the rotating surface to insure the circulation of the oil in the bearings and anti-friction races, one improves the lubrication of these and one improves the difficulties of the lubrication resulting from the vibration in contact with the rotating parts.

By these means, it is possible to increase notably the power of the rotating vibrator with unbalanced weights and to design vibration generators of this type of grade power, required for various applications.

In order to lubricate the vibration generator the unbalanced mass is provided with a rim-flange, said surface being placed in a box containing oil to permit the devices to pick up the oil from the lower part of the housing and to bring it to the upper part, so that it can flow back on the members to be lubricated.

The invention and its advantages shall be more fully described and reference is made to the appended drawings.

Fig. 1 is a view taken longitudinally along the lines I—I of Fig. 2.

Fig. 2 is a view taken transversely along the line II—II of Fig. 1.

Fig. 3 is a view in vertical section.

Fig. 4 is a view in elevation with a partial cross-section of the flange-rim of the unbalanced mass.

Figure 7:
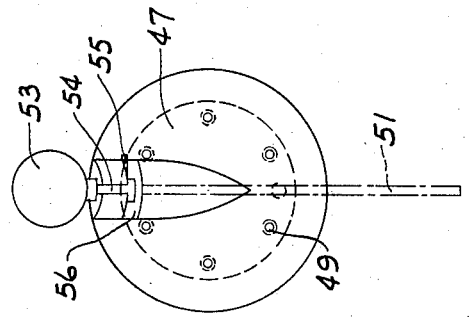
Fig. 7 is a plan view of the device for control of lubrication along the line VII—VII of Fig. 3.

The vibration generator of the envisaged type is essentially built-up by the shaft 10, kept in rotation by appropriate devices, mechanically or electric. This shaft is carried by a bearing, schematically shown by 11, which can be a plain bearing or a roller bearing or a ball bearing or leading bearing, etc. On the shaft 10 are mounted a mass 12 forming the unbalanced weight, which rotates with said shaft 10.

In the usual devices of this character a protecting cover 13 is attached to an interior disc 14 to form an enclosed housing 15, in which turns the eccentric mass 12. When rotating, the eccentric mass provokes in the housing 15 an intense commotion of the air. The stirring up of the air and friction translate themselves after a relatively short time into heating the air, which heat is transmitted to the bearings 11 and the assembly of the device. As soon as the power of the device reaches two to three kilowatts, this heating prevents lubrication of the bearing 11.

According to the invention, the mass 12 is enclosed in a circular shield 16, which gives to the rotating unbalanced weight the exterior form of a continuous disc, of a cross-section along aerodynamic lines.

When rotating in the housing 15, this disc does not produce turbulence. It glides in the air continuously in the housing 15 without friction. The disturbances which would be due to the free rotation of the eccentric mass 12 are suppressed, and the friction of the air is notably reduced. The heating and the corresponding power losses are reduced in large proportions.

At the same time the lubricating oil in the housing 13 collects in the lower part in 17. The enclosure 16 is made in such a manner to dip into the oil 17. If the shaft 10 rotates, the enclosure entrains the oil and leads it to the upper part of the housing 13, where it runs back, along the direction of the arrows, towards the bearing 11 for which it assures the lubrication.

By these means one insures in the vibrator a forced circulation and permanence of lubricating oil. This circulation associated with the reduction of heat developed, gives a great functional security, and makes the bearings or anti-friction races last longer.

In the form of the design represented in Fig. 3, the vibration generator is made from the shaft 10 of which the extreme end 18 rests in bearings 19, in roller bearings, ball bearings, needle bearings, etc., or on plain bearings enclosed in the housing 20. On the extreme end 18 of the shaft is fixed with keys 21 the enclosed unbalanced weight.

This unbalanced weight is made up by a hub 22 having a circular vein with an annular flange forming a pan-shaped disc 23. Flange section 24 is thinner than the flange section 25 which comprises the eccentric weight. This assembly forms the enclosure for one side of the eccentric weight.

On the opposite side, a disc 26 is fixed on the flanges 24 and 25 of the unbalanced weight by the screws 27 closing the hollow part of the unbalanced mass. The disc 25 is also held by a key 28 fitted on the shaft by the screw 29.

Preferably the disc 26 is also provided with a diameter slightly larger than the exterior diameter of the unbalanced mass or pan 23, in such a manner to form at its periphery, an inwardly curved flange 30 which functions as an oil slinger.

One sees, therefore, that the unbalanced mass is built up and presented in the form of a continuous disc without external forces to create disturbances of the ambient air. This eccentric mass is fitted on the shaft within the housing 15 adjacent the housing 20. This housing 15 serves at the same time as an oil reservoir. The oil is introduced by the upper opening fitted with a plug 31. It can be emptied by hand screwing plug 32.

If the enclosed unbalanced mass is rotated, producing vibrations, the flange 30 of the disc 26 passes through the oil in the lower part of the housing 15. The rotation of the disc 26 entrains oil to the upper part of the housing and projects it against the deflector 33 which slopes toward the bearing 19.

Running along the deflector 33 the oil arrives at the channels 34 and 35 and flows through the bearing 19, sufficiently lubricating the same. The excess oil runs through the channels 36 and 37 and falls back to the base of the housing 15.

In the manner in which the enclosure of the unbalanced mass fastened to the shaft 10 suppresses the disturbing effects of the rotating mass, it serves at the same time to give to the oil an accelerated circulation, these two effects adding to one another to improve the operation of the device.

It is understood that the unbalanced and enclosed mass can be designed in various fashions. In the example shown in Fig. 4, the upper half 24 (as illustrated) is narrow, while the lower half 25 is thick. The parts 24 and 25 are provided with ribs 38, connecting thus the rim 23 with the hub 22. The ribs 38 are narrower at the lower part than at the upper part, in such a manner to give greater effect to the member 25 under the action of the centrifugal force.

With this construction, the mass presents in its interior a succession of hollows or pockets 39, 40. These pockets 39 neighboring to the heavy rim section 25 may receive any type of additional weight, for example, a material of greater density. By this means one can regulate the unbalanced force of the rotating mass.

The enclosed disc 26 instead of having flanges 30 straight or bent backwards can carry at its periphery (Fig. 5) projections 41 or cut-out 42 playing the role of picking up or collecting and slinging the entrained oil and projecting onto the deflector 33. One can also use it with the disc 26 or the flange 30 shown in Fig. 3, their complement, or several discs or flanges or interrupted flanges as shown in Fig. 5.

As a variation (Fig. 6) the disc 26 or an accessory disc fixed to the unbalanced mass, carries one or several spiral channels 43. These channels can be constructed of a tube rolled in spiral form, or a simple ridge or groove inscribed into the face of the disc 26. If the disc 26, driven by the rotating mass with which it is one piece, rotates in the direction of the arrows, the extreme end 44 of the spiral 43 dips at each rotation into the oil of the housing 15 and lifts a quantity of oil, which is then entrained by the inertia towards the center 45, where it runs out through one or several holes 46 from where it is directed to the parts to be lubricated.

Figure 6:
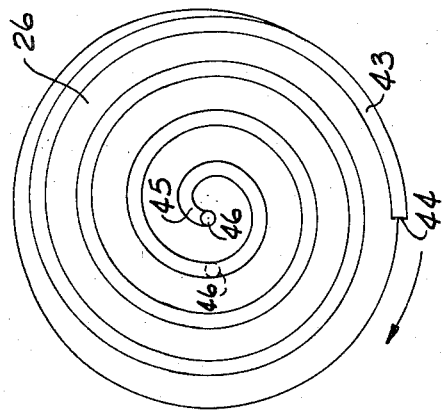
Fig. 6 is a view in elevation showing a variation.
Figure 5:
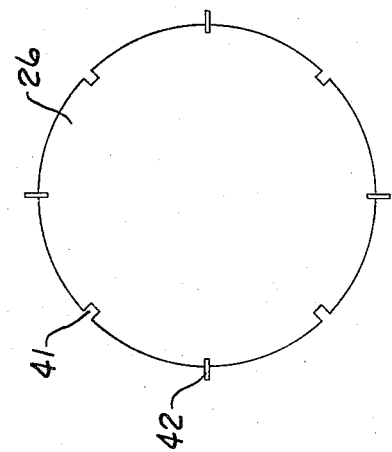
Fig. 5 is a view in elevation and design of the flange lip enclosure.

It is understood that the disc with the tubular spiral of Fig. 6 can also be used as a roating element of the rotating mass or separately, on its own or with discs according to Fig. 5, each combination being possible in accordance with the lubricating effect desired.

Whatever be the chosen design, it may be advantageous to benefit from the aerodynamic enclosure of the rotating mass according to the invention, to form the surface of the enclosure, as well as the interior wall of the box, with deflectors or other interior members, having polished surfaces. This permits further to reduce the heating of the device, notably that of the bearings.

To allow verification that the device contains always the necessary quantity of oil for its lubrication, it is recommended to mount a gauge. Such a gauge can advantageously be provided in the position shown in Figs. 3 and 7.

In the center of the housing 15 a cylindrical plug 47 is provided, held in position by a buff 48 fastened by the screws 49. The plug 47 has an oblique passage 50 receiving the gauge. This gauge is made by a bar 51, the extreme end 52 of which has the usual graduations. The other end has a ball 53 and a sleeve 54. The gauge is held in its position 50 due to its lug 55 inserted in the notch 56 with the spring 57 abutting against the lower end of the sleeve 54.

With this design one can give to the gauge a correct position, whichever the inclination of the device may be. If, for instance, the latter is mounted inclined on a hopper or a vibrating chute, it is sufficient to bring the plug on its normal position for the oil level at its lowest point for the capacity formed in the housing 15 to turn the button 47 to the required angle.

The designs described and represented do not give any limitation, and may be made in all sorts of variation of designs, as long as the unbalanced masses are fitted with enclosures according to the invention. In the foregoing one has described a vibrating generator with a single unbalanced mass, but it is understood that the invention applies also to the devices carrying two or more unbalanced masses.

It is understood that the invention is applicable not only to the vibrators disclosed herein, but also to all unbalanced members producing vibration, which are driven by any means whatsoever, pulleys, motors, turbine. In the case where the unbalanced weight is fastened to the shaft itself of an electric motor, it is interesting to use an oil which is electrically insulating, so as not to destroy the bearing by formation of oil vapors.

I claim:

1. A vibratory generator of the rotary type having an eccentric mass on a rotary member carried by bearing means supported from the wall of an enclosing chamber formed by an exterior housing, characterized by a concentric enclosure for said eccentric mass and attached to said rotary member, said concentric enclosure is materially smaller than said chamber, the bottom of said chamber provides a reservoir containing a lubricant to continuously wet said rotating concentric enclosure which slings the lubricant washing the interior of said chamber to lubricate said bearing means and cool said lubricant.

2. The vibratory generator of claim 1 characterized in that said eccentric mass extends the full width of the interior of said concentric enclosure.

3. The vibratory generator of claim 1 characterized in that said eccentric mass is a thickened rim of said concentric enclosure.

4. The vibratory generator of claim 1 characterized in that the said concentric enclosure has pocket means to receive weight means providing said eccentric mass.

5. The vibratory generator of claim 1 characterized in that said concentric enclosure has a perimetral flange means bathed in the lubricant.

6. The vibratory generator of claim 5 characterized in that said perimetral flange means has spaced sections formed by cutouts in said flange.

7. The vibratory generator of claim 5 characterized in that said perimetral flange means has projections.

8. The vibratory generator of claim 1 characterized in that said concentric enclosure has a deflector means to catch and direct lubricant to lubricate parts.

9. The vibratory generator of claim 8 characterized in that said deflector means includes a spiral tube having an inlet at the perimeter of said concentric enclosure and an outlet adjacent the axis of rotation.

10. The vibratory generator of claim 1 characterized in that one side of the exterior of said concentric enclosure has the shape of a pan with a rim and the other side is a disc closing the pan.

11. The vibratory generator of claim 1 characterized in that each side of the exterior of said concentrance enclosure has the shape of a pan with their flanged rims joined at their peripheries.

References Cited in the file of this patent

UNITED STATES PATENTS

| | | |
|---|---|---|
| 151,642 | Whitaker | June 2, 1874 |
| 2,264,908 | Blackmore | Dec. 2, 1941 |
| 2,278,839 | Douglass | Apr. 7, 1942 |
| 2,295,283 | Mall | Sept. 8, 1942 |
| 2,766,629 | Booth | Oct. 16, 1956 |